A. H. PAGE.
Clothes-Wringers.

No. 5,223. Reissued Jan. 7, 1873.

No. 5,224. Reissued Jan. 7, 1873.

No. 5,225. Reissued Jan. 7, 1873.

WITNESSES.

INVENTOR.

Abby H. Page,
by his attorney J. L. Stetson,
New York.

THE NORRIS PETERS CO., PHOTO-LITHO., WASHINGTON, D. C.

UNITED STATES PATENT OFFICE.

ALBY H. PAGE, OF MANCHESTER, NEW HAMPSHIRE, ASSIGNOR, BY MESNE ASSIGNMENTS, TO THE METROPOLITAN WASHING-MACHINE COMPANY.

IMPROVEMENT IN CLOTHES-WRINGERS.

Specification forming part of Letters Patent No. 61,680, dated January 29, 1867; reissue No. 5,223, dated January 7, 1873.

DIVISION A.

*To all whom it may concern:*

Be it known that I, ALBY H. PAGE, of Manchester, Hillsborough county, New Hampshire, formerly of South Boston, in the county of Suffolk and State of Massachusetts, have invented a new and useful invention in Clothes-Wringers; and I do hereby declare that the following is a full, clear, and exact description thereof, reference being had to the accompanying drawing and to the letters of reference thereon, in which—

Figure 2:
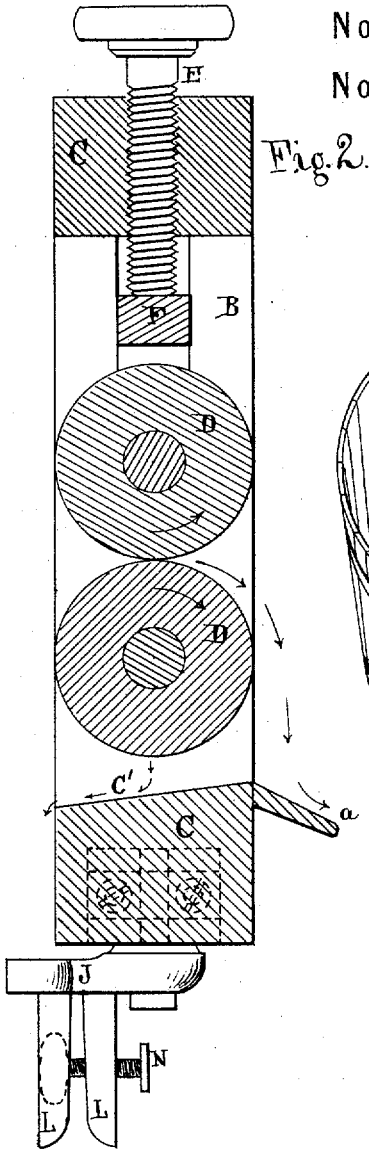
Figure 1:
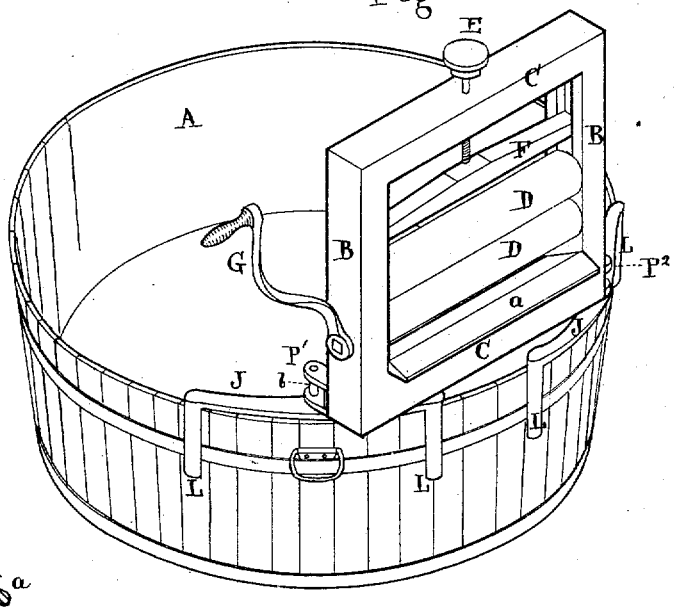
Figure 3:
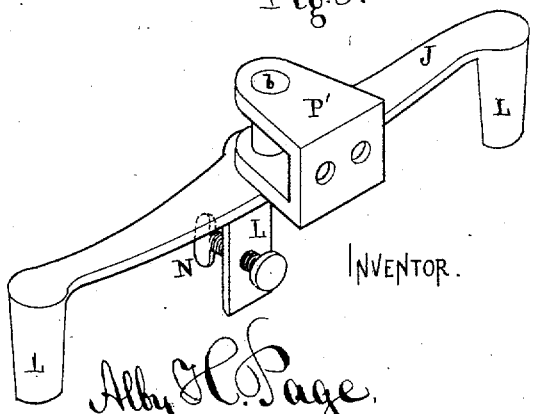

Figure 1 represents a perspective view of a wash-tub with my improved wringer clamped thereto. Fig. 2 is a vertical transverse section taken through the wringer, and showing the operation of the same. Fig. 3 is a perspective view of the clamp removed from the wringing-frame.

Similar letters of reference indicate like parts in all the figures.

The invention applies to machines for the wringing, washing, and starching of clothes by passing them between parallel rollers covered with India rubber or other elastic material, and so arranged and adjusted that the clothes can be passed between them with a proper degree of pressure to expel the water or other liquid. It relates to provisions for attaching the same to tubs or analogous vessels, whereby they are made more perfectly and conveniently attachable to tubs of different curves or diameters.

A represents an ordinary wash-tub. B B and C C represent a frame, of wood or other suitable material, for holding the rolls, with the inclined surface C′ to carry the water into the tub. A projecting shelf, *a*, inclined in the opposite direction, serves as a clothes-guide to conduct the wrung clothes over the sides of the tub. D D are two rollers which are parallel to each other, and have their bearings in the frame pieces or standards B B. These rollers are covered with white or light-colored India rubber. The upper roller B is capable of adjustment by means of a thumb-screw, E, which presses upon a bridge or spring, F, which presses upon the bearing-blocks of the upper roller.

The advantages of this manner of adjusting the pressure by means of a single screw and bridge from one bearing to the other are obvious, as it allows the roll to balance on the point of pressure and either end to rise or open most according to the thickness of clothes passing through, and only one screw has to be turned to adjust the roll.

The roller D is rotated by crank G on the outside of the frame.

J J represent two curved bars with fingers L L L, set-screw N, brackets $P^1$ $P^2$ with studs *b*, which constitute my devices for clamping the wringer to a tub.

This construction presents a swivel or joint which allows each clamping device to turn, and thus adapt itself perfectly to tubs and washing-machines of different sizes and forms.

The bracket $P^1$ is on the inner face of the framing, while the bracket $P^2$ is on the edge.

This arrangement holds the operating-crank G outboard of the tub, so as to allow it more room to turn, while the main body of the wringer is held sufficiently within the tub to allow the water to be all led inward.

The force of the hand applied to the crank tends to twist the wringer around alternately one way and the other.

The employment of the two distinct sets of clamping devices, and the taking firm hold on the edge of the tub at points so far removed from each other, provides for very effectually resisting such torsional strain.

Having thus fully described my invention, I will refer more particularly to what I claim as new and useful.

I do not claim the application of an elastic gum to the rolls of the wringing-machine; nor do I claim the application of screws for adjusting the pressure; but

What I claim in this patent, as an improvement in clothes-wringers, is—

1. In a wringer having a pair of squeezing-rollers and an operating-crank and two uprights or standards, the employment of clamping means arranged to take hold of the tub at or near the base of each standard.

2. The construction of the clamping devices each with three fingers adapted to apply two on one face and one on the other face of the tub, as and for the purposes specified.

3. The application of a clamping device to a wringer with a swivel-joint to adapt itself to tubs of various forms.

In testimony whereof I have hereunto set my name in presence of two subscribing witnesses.

ALBY H. PAGE.

Witnesses:

THOMAS D. STETSON,
WM. C. DEY.